US010057216B2

United States Patent
Brunn et al.

(10) Patent No.: US 10,057,216 B2
(45) Date of Patent: Aug. 21, 2018

(54) MENTION IDENTIFICATION FOR UNTRUSTED CONTENT

(71) Applicant: INTERNATIONAL BUSINESS MACHINES CORPORATION, Armonk, NY (US)

(72) Inventors: Jonathan F. Brunn, Logan, UT (US); Vincent Burckhardt, Clonee (IE); Ryan A. Davis, Raleigh, NC (US); Claudio Procida, Dublin (IE)

(73) Assignee: International Business Machines Corporation, Armonk, NY (US)

( * ) Notice: Subject to any disclaimer, the term of this patent is extended or adjusted under 35 U.S.C. 154(b) by 25 days.

(21) Appl. No.: 15/168,585

(22) Filed: May 31, 2016

(65) Prior Publication Data

US 2016/0380946 A1    Dec. 29, 2016

Related U.S. Application Data

(63) Continuation of application No. 14/748,853, filed on Jun. 24, 2015.

(51) Int. Cl.
*G06F 7/04* (2006.01)
*G06F 17/30* (2006.01)
(Continued)

(52) U.S. Cl.
CPC ........ *H04L 63/0421* (2013.01); *G06F 17/218* (2013.01); *G06F 17/241* (2013.01);
(Continued)

(58) Field of Classification Search
CPC .............................. H04L 51/18; G06F 3/0482
(Continued)

(56) References Cited

U.S. PATENT DOCUMENTS 9,058,391 B2 *   6/2015   Shriber ............. G06F 17/30867
9,224,103 B1 *  12/2015   Subramanya ........ G06N 99/005
(Continued)

FOREIGN PATENT DOCUMENTS

WO    2012154631 A2    11/2012

OTHER PUBLICATIONS

Mike Thelwall; Sentiment Strength Detection for the Social Web; Journal of the American Society for Information Science and Technology; year:2011; p. 1-14.*
(Continued)

*Primary Examiner* — Monjour Rahim
(74) *Attorney, Agent, or Firm* — Charles L. Moore; Moore & Van Allen PLLC

(57) ABSTRACT

In some embodiments of the invention a method provides for processing a mention in textual content being input to a content provider. The method can include detecting input by a user of the content provider of the mention and identifying a member of a mention provider such as a social network based on the mention while maintaining privacy of information about the member with respect to the content provider. In some embodiments a computer program product for processing the mention includes a computer readable storage medium having program instructions embodied therewith. In some embodiments of the invention, a system for processing the mention includes a computer system readable media with a program module embodied therewith to detect the mention in the textual content as provided to a content provider. A network adapter with the system can provide the program module or program modules over a network.

10 Claims, 4 Drawing Sheets

(51) Int. Cl.
*H04N 7/16* (2011.01)
*H04L 29/06* (2006.01)
*H04L 12/58* (2006.01)
*G06F 17/27* (2006.01)
*H04L 29/08* (2006.01)
*G06F 17/21* (2006.01)
*G06F 17/24* (2006.01)

(52) U.S. Cl.
CPC ............ *G06F 17/276* (2013.01); *H04L 51/14* (2013.01); *H04L 51/18* (2013.01); *H04L 51/32* (2013.01); *H04L 63/0414* (2013.01); *H04L 67/02* (2013.01)

(58) Field of Classification Search
USPC ......................................................... 726/26
See application file for complete search history.

(56) References Cited

U.S. PATENT DOCUMENTS

| | | | |
|---|---|---|---|
| 2004/0210776 A1 | 10/2004 | Shah et al. | |
| 2009/0209286 A1 | 8/2009 | Bentley et al. | |
| 2010/0211868 A1* | 8/2010 | Karmarkar | H04M 1/72547 715/234 |
| 2010/0318925 A1 | 12/2010 | Sethi et al. | |
| 2012/0072835 A1* | 3/2012 | Gross | G06Q 30/0269 715/243 |
| 2012/0078870 A1* | 3/2012 | Bazaz | G06F 17/30247 707/706 |
| 2012/0144316 A1* | 6/2012 | Deng | G06Q 30/02 715/751 |
| 2012/0271856 A1 | 10/2012 | Carr et al. | |
| 2013/0018869 A1* | 1/2013 | Hanson | G06F 17/3089 707/722 |
| 2013/0085846 A1* | 4/2013 | Galarneau | G06Q 30/06 705/14.49 |
| 2013/0346877 A1* | 12/2013 | Borovoy | H04L 65/403 715/753 |
| 2014/0013249 A1* | 1/2014 | Moeinifar | H04L 51/00 715/758 |
| 2014/0149502 A1 | 5/2014 | Rajaram et al. | |
| 2014/0157145 A1* | 6/2014 | Bush | G06Q 50/01 715/745 |
| 2014/0189809 A1 | 7/2014 | Koved et al. | |
| 2014/0257795 A1* | 9/2014 | Birnbaum | G06F 17/2765 704/9 |
| 2014/0280594 A1* | 9/2014 | Everton | H04L 51/32 709/204 |
| 2014/0337436 A1* | 11/2014 | Hoagland | G06F 17/30867 709/204 |
| 2014/0351263 A1* | 11/2014 | McConnell | G06F 17/30699 707/748 |
| 2014/0359008 A1* | 12/2014 | Finney | G06Q 10/00 709/204 |
| 2015/0081674 A1* | 3/2015 | Ali | G06F 17/30991 707/722 |
| 2015/0207765 A1* | 7/2015 | Brantingham | H04L 51/046 715/758 |
| 2015/0324454 A1* | 11/2015 | Roberts | G06F 17/30648 707/734 |
| 2015/0371341 A1* | 12/2015 | Iyer | H04L 51/32 705/319 |
| 2016/0042067 A1* | 2/2016 | Weng | G06Q 50/01 707/723 |
| 2016/0202879 A1* | 7/2016 | Chen | G06F 3/04842 715/753 |

OTHER PUBLICATIONS

Anonymous; "Method and System for Managing, Creating, Distributing and Displaying Tagged Names in Social Networks," IP.com, 2013, <http://null/IPCOM/000233769>, 2 pages.

International Business Machines Corporation, "List of IBM Patents or Patent Applications Treated As Related," submitted May 31, 2016, 2 Pages.

* cited by examiner

MENTION IDENTIFICATION FOR UNTRUSTED CONTENT

CROSS-REFERENCE TO RELATED APPLICATION

This application is a continuation application of and claims priority from commonly owned U.S. patent application Ser. No. 14/748,853, filed Jun. 24, 2015, the entire contents of which is incorporated herein by reference.

BACKGROUND

The present invention is in the field of on-line communications, and more particularly in the field of identifying users of social networking services in an on-line environment maintained by a content provider other than the social networking service provider itself. Social networks have become one of the dominant forms of human interaction over the Internet in the last few years. Accordingly, active users of social networking services are often identified in various media by a social network user name. The "mention" of a person using their name or user ID for a social networking service in media or in a text entry on some other content service can sometimes be referred to as an "@mention"—pronounced "at mention."

Often, such a text entry on the other content service amounts to an editable content field, such as input to a blog. The @mention effectively serves as an identifying reference for the member of a social network, whether the member is the person entering text or somebody else. If the social networking service and the other content service are integrated together in some way or exchange detailed information about users, the "mentioned" user can be notified of the @mention or other actions can be taken. Otherwise, the mention merely serves as information for potential readers.

SUMMARY

In some embodiments of the invention a method is provided for processing a mention in textual content being input to a content provider. In some embodiments the method includes detecting input by a user of the content provider of the mention in the textual content. The method can also include identifying a member of a mention provider based on the mention while maintaining privacy of information about the member with respect to the content provider. In some embodiments of the invention, a computer program product for processing the mention in the textual content being input to the content provider includes a computer readable storage medium having program instructions embodied therewith. The computer readable storage medium is not a transitory signal per se. The program instructions are executable by a computer system to cause the computer system to perform a method of an example embodiment of the invention.

In some embodiments of the invention, a system for processing a mention in textual content includes a computer system readable media with a program module embodied therewith to detect the mention in the textual content as provided to a content provider by a user. The program module can also provide a display for the user enabling completion of the mention. A network adapter with the system can provide the program module or program modules over a network. A processing unit is operable in some embodiments to forward the program module or program modules over the network, detect the mention, receive the mention over the network, provide suggestions regarding completion of the mention, and identify a member of a mention provider such as a social network based on the mention. The system can identify the member while maintaining privacy of information about the member with respect to the content provider.

DETAILED DESCRIPTION

Figure 1A:
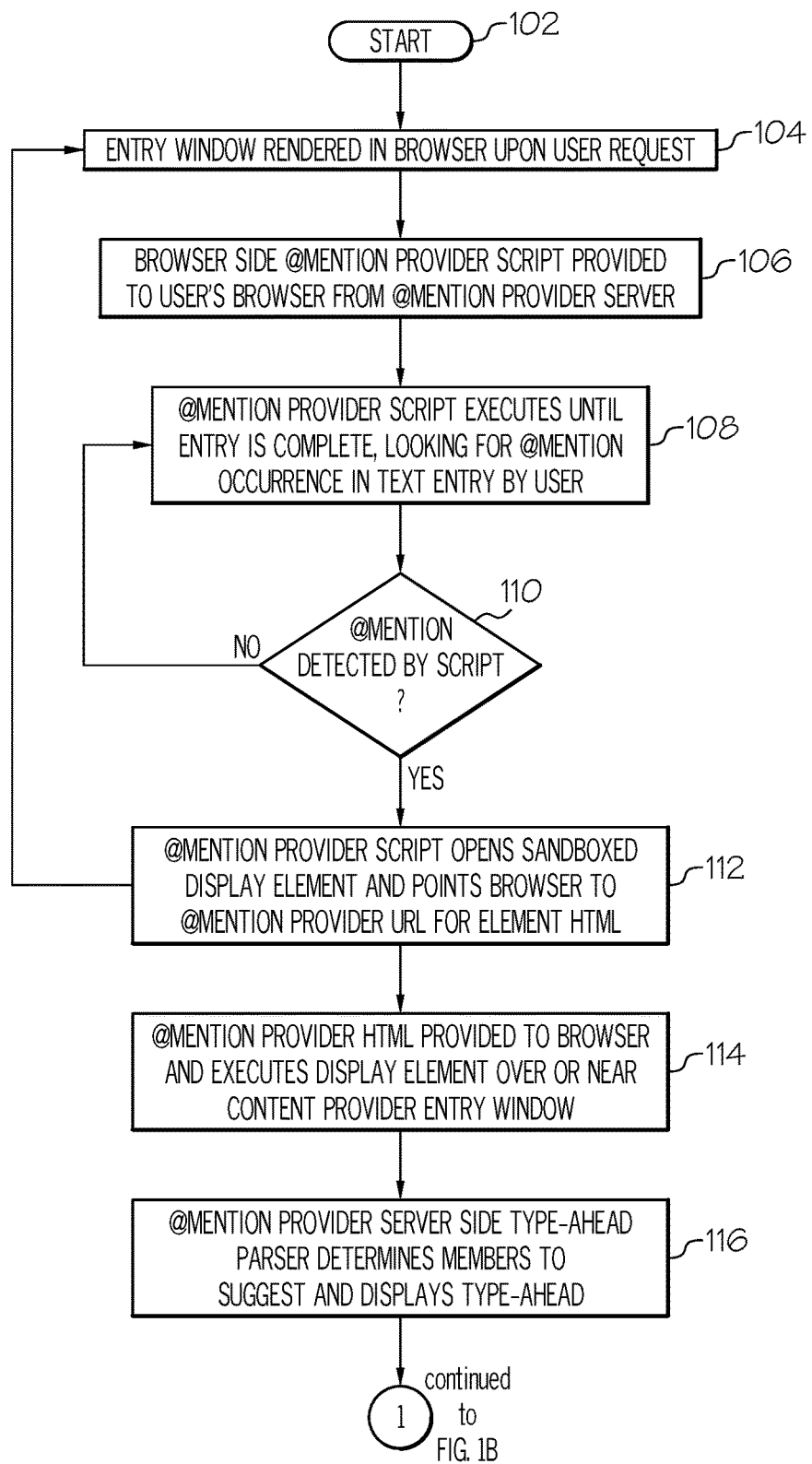
FIG. 1A and FIG. 1B depict a flowchart illustrating a method of some example embodiments of the invention.

Embodiments of the present invention now will be described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present invention.

Relative terms such as "below" or "above" may be used herein to describe a relationship of one element, device, or region to another element, device or region as illustrated in the figures. It will be understood that these terms are intended to encompass different orientations of the device, parts, regions or elements of an embodiment in addition to the orientation depicted in the figures.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms used herein should be interpreted as having a meaning that is consistent with their meaning in the context of this specification and the relevant art and should not be interpreted in an idealized or overly formal sense unless expressly so defined herein.

Unless otherwise expressly stated, comparative, quantitative terms such as "less," "fewer" and "greater", are intended to encompass the concept of equality. As an example, "less" can mean not only "less" in the strictest mathematical sense, but also, "less than or equal to."

The present invention may be a system, a method, and/or a computer program product. The computer program product may include a computer readable storage medium (or media) having computer readable program instructions thereon for causing a processor to carry out aspects of the present invention. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Active users of social networking services are often identified in various media by a social network user name. The "mention" of a person using their name or user ID for a social networking service in media or in a text entry on some other content service can sometimes be referred to as an "@mention"—pronounced "at mention." With an embodiment of the present invention, if a user is contributing text or rich text on any Web site, the user can make a "mention" of another user from their social network, or from any known social network. For purposes of this disclosure, the operator of the Web site where the textual content is being entered may be referred to as a content provider. Real-world examples of such Web sites include the blog Web site WordPress.com and even shopping sites that provide for user commentary and/or reviews such as Amazon.com. For purposes of this disclosure, a social network can have the customary meaning when referring to on-line services. However, the term "social network" can mean any entity that provides for @mentions relating to its members, whether or not it meets the customary definition of a social network. Thus, the terms "social network" and "@mention provider" can be used interchangeably and synonymously herein. It should also be noted that an @mention provider can be an intermediary entity acting on behalf of another entity such as a traditional social network. Examples of commonly known social networks include Facebook.com, LinkedIn.com and Twitter.com. For purposes of this disclosure, we refer to the person entering textual content as a "user" and we refer to the mentioned member of the social network or @mention provider as a "member."

Example embodiments of the invention provide for a social network, or an intermediary facilitating operation of the social network, to allow @mentions, which may be referred to herein as "mentions" to be added to an existing service or existing text field (referred to herein in any case as "textual content") without the content provider needing to make server side changes to the component where mentions are used. Further, the @mentions provider can detect and identify the @mention, determine the relevant member, and take action with respect to its member without sharing any private information about the member with the content provider, whose content may be untrusted. Thus, the content provider can own and manage its comments without ceding space or control to the @mentions provider or social network, while still allowing use of mentions as if the end user was commenting inside the social networking environment, all without server code or schema changes by the content provider.

Figure 1B:
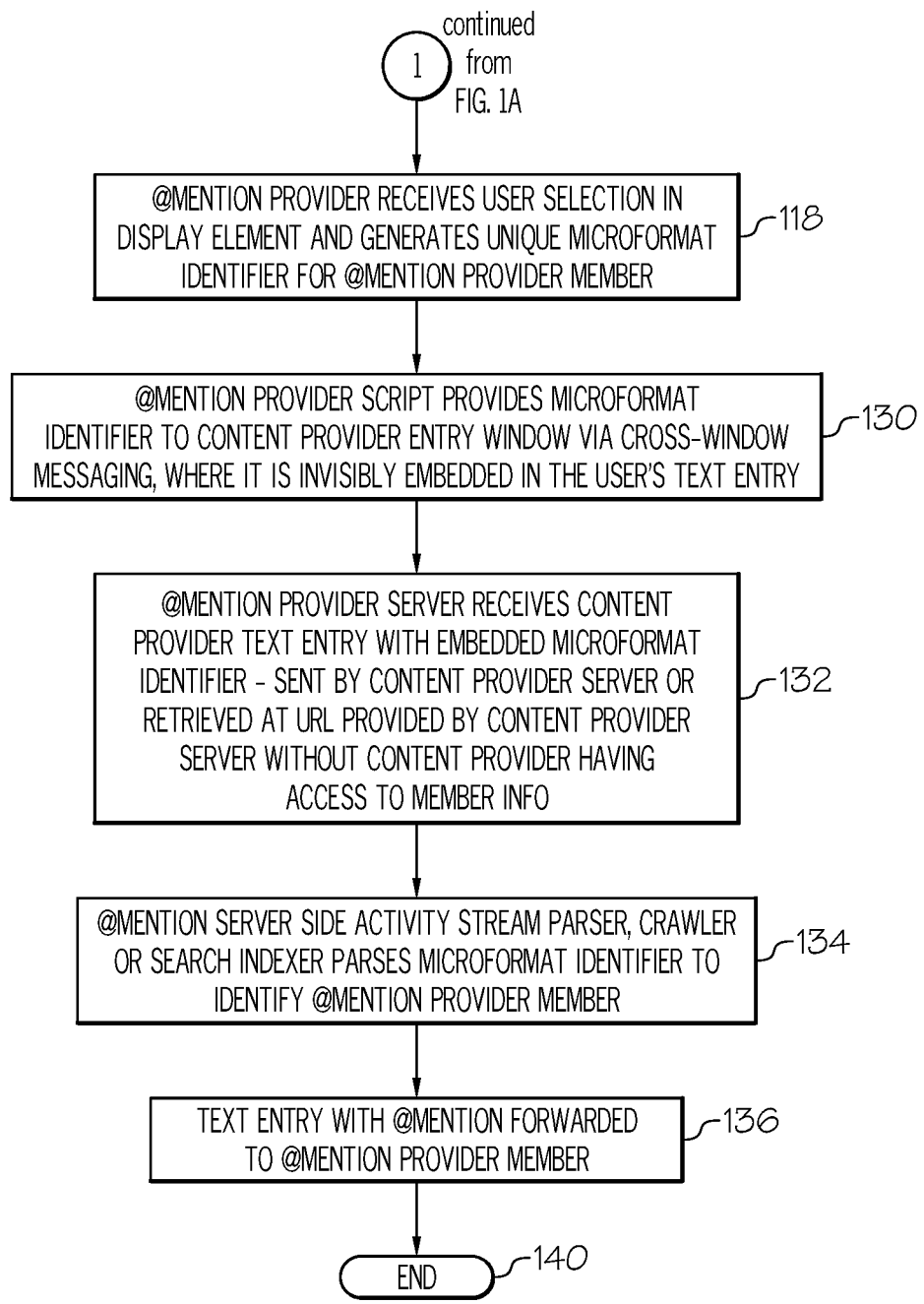

FIG. 1A and FIG. 1B depict a flowchart illustrating a process 100 according to example embodiments of the invention. The process begins at block 102. At block 104 an entry window in a browser is open upon a request from one of the content provider's users. At block 106, a browser side script is provided to the user's browser by the social network server—the @mention provider. At blocks 108 and 110, the script executes until an entry is completed, or an @mention occurrence is detected in textual content being entered by the user at block 110. At block 112, when the mention has been detected, the script points the user's browser to the social network or mention provider URL to retrieve the HTML code for a sandboxed display element, and opens the display element in the browser. A sandboxed display element is a display element, the content of which cannot be accessed by the content provider. An iframe is an example of a sandboxed display element. At block 114, the display element code executes the display element over or near the content provider entry window that is accepting input from the user. At block 116, an @mention provider server-side parser, which is accessed by the script, determines members to suggest and displays type-ahead suggestions. Type ahead parsing of the mention is provided by the script, and suggestions are presented to the user, wherein the suggestions pertain to possible options for completing the mention. These suggestions are displayed with the window for the textual content. Details of how this process appears to the user will be discussed below with respect to FIG. 2.

Referring to FIG. 1B, at block 118, the browser script receives, in the sandboxed display element, the user selection of a specific member of the social network. The "selection" can be made by manually typing the entire mention or by picking from the suggestions. The @mention provider identifies the user and generates a unique microformat identifier for the member. The identifier is understood only to the @mention provider. Thus the social network provides a way to embed an identifier in the textual content even if the content is untrusted, where the identifier can be used to determine which member of the social network the mention refers to. At block 130, the script provides the microformat identifier to the content provider entry window, where it is embedded in the textual content, for example, a text entry on a Website. In at least some embodiments, the microformat identifier is forwarded from the sandboxed display element to the entry window by cross window messaging. At block 132, the @mention provider receives the text entry from the content provider with the embedded microformat identifier. In some embodiments, the content provider server forwards the textual content with the embedded microformat identifier to the @mention provider. In an alternate embodiment, the content provider notifies the @mention provider that it has received textual content with an embedded microformat identifier and provides a URL to the @mention provider. It is then up to the @mention provider server to retrieve the textual content and ascertain the microformat identifier. A microformat identifier can be an identifier generated for each specific mention.

Still referring to FIG. 1B, at block 134, a server-side activity stream parser, controller, or search indexer parses the microformat identifier and identifies the member of the @mention provider. Note that the content provider does not need access to information about the member of the @mention provider. The @mention provider has been able to identify a member based on the @mention while maintaining privacy of information about the member with respect to the content provider and the textual content. In addition, the content provider has not had to extensively modify its systems to enable mentions to be identified by an @mention provider such as a social networking Web site. At block 136, the text entry with the mention is forwarded to the member by the @mention provider. Process 100 ends at block 140.

A server side activity stream parser maintained by the @mention provider can analyze the container with the textual content and the mention. A list of potential member matches (persons or groups) is analyzed as determined from the previously assigned microformat identifier. A background process runs to determine whether or not the selected member may encounter any issues in receiving a notification of the @mention in content within a community that the member may not have access to. If so, the content itself can be sent to the member. Otherwise a reference to the content at the content provider server may be sent as part of the notification to the member of the @mention.

Figure 2:
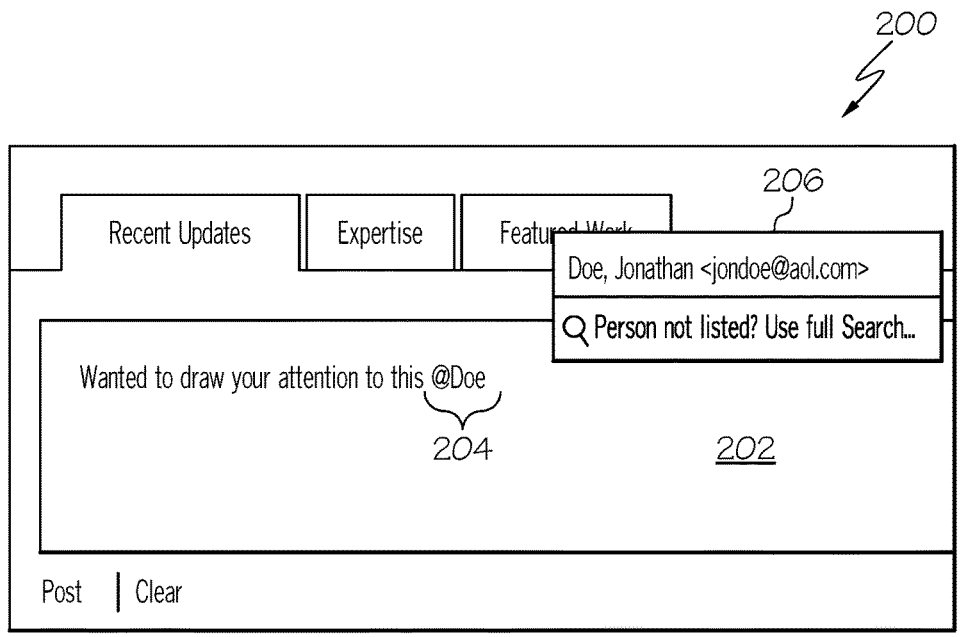
FIG. 2 is a screenshot illustrating what a user of a content provider might see when an embodiment of the invention is in use.

FIG. 2 is a screen shot that illustrates the user experience when the invention is being employed by a social network or intermediary entity that is in communication with the content provider. Screen 200 includes an entry window 202 where textual content is being input. A mention has been typed at 204, and the type-ahead is being presented at 206, which in this example embodiment is an iframe. The overlaid iframe from the @mention provider is located above the text field of the content provider and illustrates the @mention type-ahead capability, which can be provided while protecting the user's social network data from consumption by the content provider. Cross window messaging can be used to send messages from the @mentions provider iframe to the window of the content provider once a user is selected inside the picker provided in the @mention provider's iframe. Cross window messaging used here may include Window.postMessage from HTML5 or other known techniques for cross iframe messaging when formal cross window messaging APIs are not available.

Once selected in the protected space of the iframe, an identifier of the @mention or mentioned user is sent to the content provider through cross window messaging techniques. This identifier may simply be an identifier of the mentioned user, however, to further protect the user's contacts from the content provider, the identifier may be an identifier specifically generated for this @mention, referred to herein as a microformat identifier. In this case, the association of the identifier (mention ID) to the member being mentioned can be stored in a database on the @mention provider server.

When the @mention is displayed as shown in FIG. 2, the user interface plugin for the iframe adapts the display of the content from the content provider to include enough space for the @mention (dependent on the length of the display name of the @mentioned user) and then uses the iframe or an image to display the name of the mentioned user at the appropriate place in the content field. Loading of the iframe or image containing the name of the mentioned user is contingent on authorization tokens (such as cookies) from the user's browser thereby further protecting unauthorized client (and the content provider) from loading the content of the iframe, and thereby seeing the name of the mentioned user, without authorization.

Provision can be made to authenticate the user to load the content of the iframe if desired. In such an embodiment, if the user is not authenticated, a variety of mechanisms may be triggered to authenticate the user (for instance, a link to a login page may be displayed instead of the above-discussed mention features). These authorization cookies may be created during login with the @mention provider, but be independent from login or session cookies and may have a longer life so as to enable display of the @mention for a longer time than is permitted by normal login expirations. The display of the name of the mentioned user can therefore be controlled by privacy settings in the social network.

Figure 3:
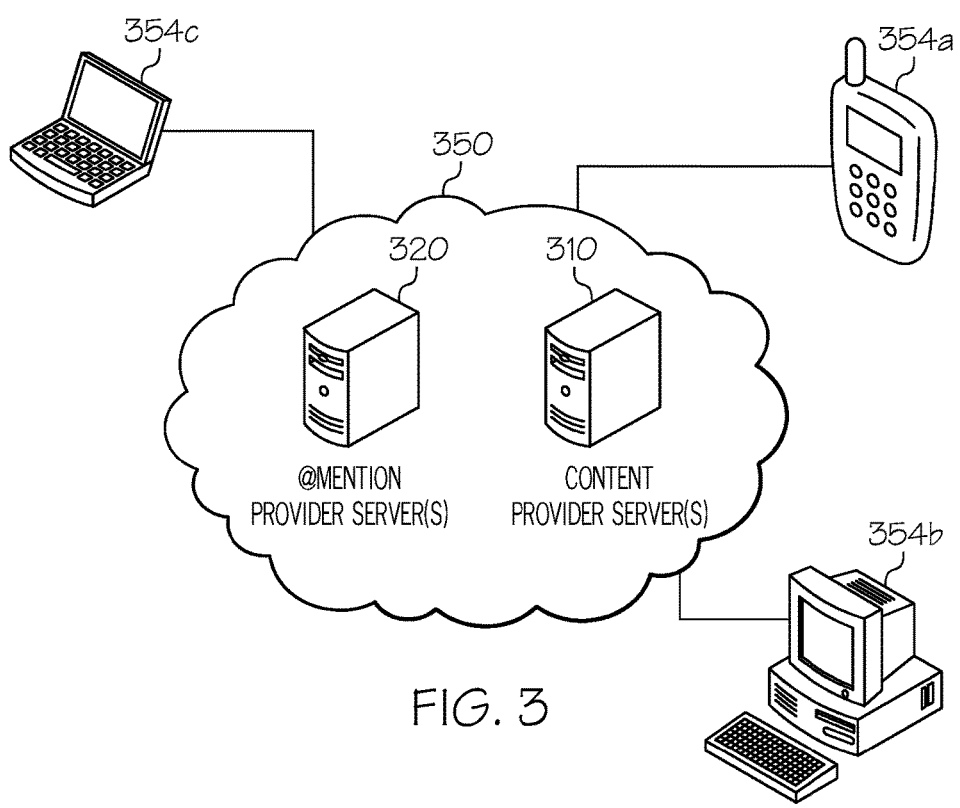
FIG. 3 is a block diagram of a computing environment of example embodiments of the invention.

Referring now to FIG. 3, illustrative computing environment 350 is depicted. As shown, computing environment 350 comprises one or more computer system servers 310 operated by a content provider and one or more computer system servers 320 operated by an @mention provider such as a social network host. These servers act as computing nodes within the computing environment. Further, computing environment 350 includes local computing devices operated by users and/or members, such as, for example, personal digital assistant (PDA) or cellular telephone 354A, desktop computer 354B, and laptop computer 354C. Servers 310 and 320 (and additional servers) may communicate with one another to exchange iframes, Web scripts, microformat identifiers, and other information, data structures or programs to enable embodiments of the invention. Since service providers such as the @mention provider and the content provider typically rely on multiple servers, both for efficiency and redundancy, multiple servers for each (not shown) may be grouped physically or virtually, in one or more networks within the computing environment, such as Private, Community, Public, or Hybrid networks or clouds, or a combination thereof. This allows computing environment 350 to offer infrastructure, platforms and/or software so that users and members need not necessarily maintain resources on a local computing device. It is understood that the types of computing devices shown in FIG. 3 are intended to be illustrative only and that the servers can communicate with any type of computerized device over any type of network and/or network addressable connection (e.g., using a Web browser).

Figure 4:
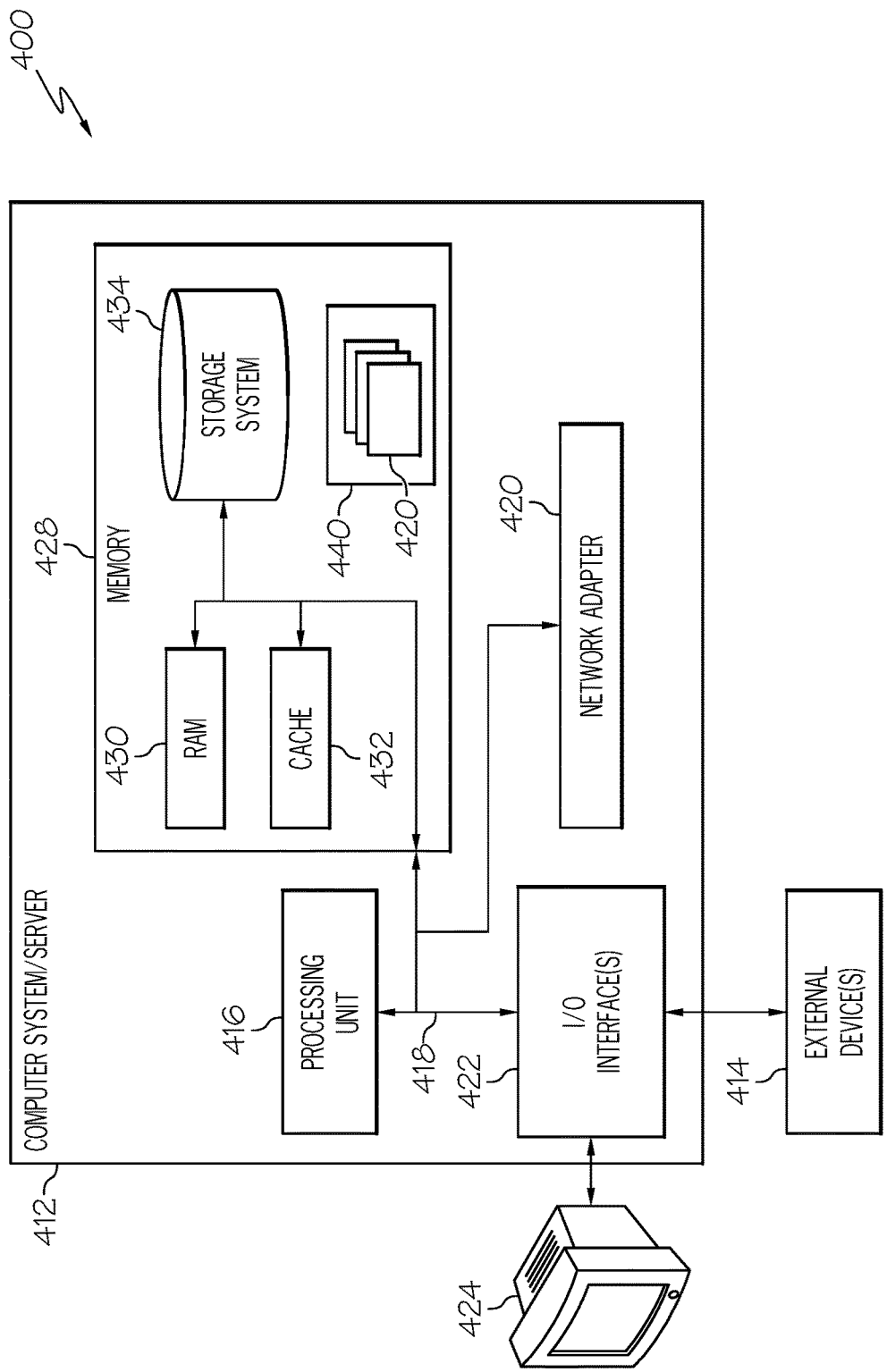
FIG. 4 is a block diagram of a computer system that is part of the environment illustrated in FIG. 3 and that is used to implement some embodiments of the invention.

FIG. 4 shows a schematic block diagram of an example computing system that can be used for implementing an embodiment of the invention, for example, by the @mention provider. Such a system may also be referred to as a computing node, computing system, processing system, or more directly, a "system." System 400 is only one example of a suitable computing system and is not intended to suggest any limitation as to the scope of use or functionality of embodiments of the invention described herein. Regardless, system 400 is capable of being implemented and/or performing any of the functionality set forth hereinabove. In system 400 there is a computer system server 412, which is operational with numerous other general purpose or special purpose computing system environments or configurations. Examples of well-known computing systems, environments, and/or configurations that may be suitable for use with or as computer system server 412 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system server 412 may be described in the general context of computer system and executable instructions, such as program modules, being executed by a computer system. Generally, program modules may include routines, programs, objects, components, logic, data structures, and so on that perform particular tasks or implement particular abstract data types. Computer system server 412 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 4, computer system server 412 is shown in the form of a general-purpose computing device. The components of computer system server 412 may include, but are not limited to, one or more processors or processing units 416, a system memory 428, and a bus 418 that couples various system components including system memory 428 to processor 416. Bus 418 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system server 412 typically includes a variety of computer system readable media. Such media may be any available media that is accessible by computer system server 412, and it includes both volatile and non-volatile media, removable and non-removable media.

System memory 428 can include computer system readable media in the form of volatile memory, such as random access memory (RAM) 430 and/or cache memory 432. Computer system server 412 may further include other removable/non-removable, volatile/non-volatile computer system storage media. By way of example only, storage system 434 can be provided for reading from and writing to a nonremovable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 418 by one or more data media interfaces. As will be further depicted and described below, memory 428 may include at least one program product having a set (e.g., at least one) of program modules that are configured to carry out the functions of embodiments of the invention.

Program/utility 440, having a set (at least one) of program modules 420, may be stored in memory 428 by way of example, and not limitation, as well as an operating system, one or more application programs, other program modules, and program data. A first and a second program module are schematically shown, however fewer, greater, or any number of program modules may be present. Each of the operating system, one or more application programs, other program modules, and program data or some combination thereof, may include an implementation of a networking environment. Program modules 420 generally carry out the functions and/or methodologies of embodiments of the invention as described herein. These program modules can include the iframe and the Web browser script previously discussed, which can reside here and be copied over the network to a content provider or to a user's computer when the content provider servers are accessed, under the control of processing unit 416.

Computer system server 412 may also communicate with one or more external devices 414 such as a keyboard, a pointing device, a display 424, etc.; one or more devices that enable a user to interact with computer system server 412; and/or any devices (e.g., network card, modem, etc.) that enable computer system server 412 to communicate with one or more other computing devices. Such communication can occur via Input/Output (I/O) interfaces 422. Still yet, computer system server 412 can communicate with one or more networks such as a local area network (LAN), a general wide area network (WAN), and/or a public network (e.g., the Internet) via network interfaces 420. As depicted, network interfaces 420 can include a hardware adapter that communicates with the other components of computer system/server 412 via bus 418. It should be understood that although not shown, other hardware and/or software components could be used in conjunction with computer system server 412. Examples, include, but are not limited to: microcode, device drivers, redundant processing units, external disk drive arrays, RAID systems, tape drives, and data archival storage systems, etc.

Although specific embodiments have been illustrated and described herein, those of ordinary skill in the art appreciate that any arrangement which is calculated to achieve the same purpose may be substituted for the specific embodiments shown and that the invention has other applications in other environments. The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein. The following claims are in no way intended to limit the scope of the invention to the specific embodiments described herein.

The invention claimed is:

1. A method of processing an @mention in textual content being input to a content provider, the method comprising:
   accessing, by a hardware processor, a non-transitory program module, the non-transitory program module being accessed from a computer system readable device;
   providing the non-transitory program module over a network to a content provider server;
   detecting input from a user of the content provider of the @mention in the textual content, the input being detected by the content provider server;
   identifying, by a social network server, a member of a social network based on the @mention while maintaining privacy of information about the member stored on the social network server in the social network with respect to the content provider server;
   generating an identifier for the member by the social network server in response to the social network server identifying the member based on the @mention; and
   invisibly embedding the identifier in the textual content, the identifier being used to identify the member of the social network to whom the @mention refers;
   pointing a web browser of the user to the social network server in response to detecting the @mention to retrieve code for a sandboxed display element;
   opening the sandboxed display element in the web browser of the user over or near an entry window of the content provider for entering the textual content; and
   presenting type-ahead suggestions for selection by the user for completing the @mention in the sandboxed display element, wherein content in the sandboxed display element cannot be accessed by the content provider.

2. The method of claim 1 further comprising notifying the member of the @mention.

3. The method of claim 2 wherein the non-transitory program module further comprises a Web browser script.

4. The method of claim 3 further comprising:
   type-ahead parsing the @mention by the Web browser script; and
   presenting suggestions to the user providing the input, the suggestions regarding completing the @mention.

5. The method of claim 4 wherein the presenting of the suggestions further comprises providing an iframe to display the suggestions to the user simultaneously with an entry window for the textual content, wherein content of the iframe cannot be accessed by the content provider.

6. The method of claim 5 wherein generating the identifier comprises generating a unique microformat identifier.

7. The method of claim 6 further comprising causing cross-window messaging of the microformat identifier from the iframe to the entry window.

8. The method of claim 1, wherein the identifier corresponding to the member is understood only by the social network server.

9. The method of claim 1, further comprising generating a different unique identifier for each specific @mention.

10. The method of claim 1, further comprising storing the identifier is association with the member of the social network in a database on the social network server.

* * * * *